United States Patent [19]

Charbonneau et al.

[11] Patent Number: 4,699,843
[45] Date of Patent: Oct. 13, 1987

[54] AZLACTONE-CONTAINING PRESSURE-SENSITIVE ADHESIVES

[75] Inventors: Robert R. Charbonneau, Lake Elmo; Steven M. Heilmann, North St. Paul; Jerald K. Rasmussen, Stillwater; Michael L. Tumey, St. Paul, all of Minn.

[73] Assignee: Minnesota Mining and Manufacturing Company, St. Paul, Minn.

[21] Appl. No.: 877,794

[22] Filed: Jun. 24, 1986

Related U.S. Application Data

[62] Division of Ser. No. 676,206, Nov. 28, 1984, Pat. No. 4,619,867, which is a division of Ser. No. 504,213, Jun. 14, 1983, abandoned.

[51] Int. Cl.$^4$ ............................................. C08F 26/06
[52] U.S. Cl. ................................... 428/355; 526/260; 526/258
[58] Field of Search ................. 526/258, 260; 428/355

[56] References Cited

U.S. PATENT DOCUMENTS

| Re. 24,906 | 12/1960 | Ulrich ................................. | 206/59 |
|---|---|---|---|
| 3,061,567 | 10/1962 | Keil .................................... | 260/29.2 |
| 3,583,950 | 6/1971 | Kollinsky et al. ................... | 260/78 |
| 3,598,790 | 9/1971 | Kollinsky et al. ................... | 526/260 |
| 4,157,418 | 6/1979 | Heilmann ........................... | 428/355 |
| 4,181,752 | 1/1980 | Martens et al. .................... | 427/54.1 |
| 4,216,252 | 8/1980 | Moeller .............................. | 427/38 |
| 4,304,705 | 12/1981 | Heilmann et al. ................. | 260/30.4 |

FOREIGN PATENT DOCUMENTS 627947 10/1963 Canada.
1121418 7/1968 United Kingdom.

OTHER PUBLICATIONS

Sorenson, W. R. and Campbell, T. W., "Preparative Methods of Polymer Chemistry", Interscience: New York (1968) p. 209.
Taylor, L. D., et al., *J. Polymer Sci.: Polymer Lett.*, 9, 187 (1971).
Heilmann, S., et al., *J. Appl. Polymer Sci.*, 24, 1551 (1979).

*Primary Examiner*—Joseph L. Schofer
*Assistant Examiner*—Peter D. Molcahy
*Attorney, Agent, or Firm*—Donald M. Sell; James A. Smith; Lorraine R. Sherman

[57] ABSTRACT

Pressure-sensitive adhesives are prepared by the simultaneous polymerization of minor amounts of at least one alkenyl azlactone monomer and at least one arylic-functional carboxylic acid monomer, or precursors thereof, with a major amount of at least one acrylic monomer. The pressure-sensitive adhesives, after application to a substrate, will significantly increase in adhesion to the resultant bonded substrate after they are in the bonded configuration.

12 Claims, No Drawings

AZLACTONE-CONTAINING PRESSURE-SENSITIVE ADHESIVES

This is a division of application Ser. No. 676,206, filed Nov. 28, 1984, now U.S. Pat. No. 4,619,867, which is a division of application Ser. No. 504,213, filed June 14, 1983, and now abandoned.

FIELD OF THE INVENTION

The present invention relates to pressure-sensitive adhesives and tape articles prepared therefrom. The adhesives are derived from both an alkenyl azlactone and an acrylic-functional carboxylic acid monomer or precursors thereof as well as a major amount of an ethylenically-unsaturated monomer.

BACKGROUND OF THE INVENTION

Pressure-sensitive adhesive tapes are well known in the art. An "adhesive", as defined by G. G. Hawley in "The Condensed Chemical Dictionary", 9th Edition, Van Nostrand Reinhold: New York (1977), is "any substance, inorganic or organic, natural or synthetic, that is capable of bonding other substances together by surface attachment". A pressure-sensitive adhesive (PSA) is generally a component of a pressure-sensitive tape which in its most simple configuration is comprised of the adhesive and a backing, and the overall construction is tacky and adherent at the use temperature (typically room temperature) and adheres to a variety of substrates using only moderate (typically fingertip) pressure to form the bond. In this fashion, pressure-sensitive tapes constitute a complete, self-contained bonding system.

A good pressure-sensitive adhesive, according to D. W. Aubrey in "Developments in Adhesives", ed. W. C. Wake, Vol. 1, Chapter 5, Applied Science Publishers, London (1977), must fulfill three main technical requirements:

1. The adhesive must exhibit adequate resistance to shear under the influence of an applied load; this relates to the adhesive's cohesion.
2. The adhesive must conform quickly to the surface to which it is applied in order to rapidly form a bond; this relates to tack.
3. The adhesive must display adequate resistance to separation by peeling once the bond is formed; this requirement relates to adhesion. These three requirements are assessed generally by means of tests which are designed to measure cohesion (shear holding power), tack, and adhesion (peel strength). These measurements taken together constitute the "balance of properties" often used to characterize PSA's.

Of the parameters that have relevance for a PSA in the bonded condition, namely cohesion and adhesion, numerous methods have been developed for increasing cohesion of PSA's subsequent to preparation and coating of the adhesive, e.g., various crosslinking reactions. Adhesion, on the other hand, can as a rule be controlled only at the stage of adhesive preparation. Adhesion is influenced by bulk viscoelastic behavior (related to the polymer glass transition temperature, Tg) and interfacial attractive forces between the adhesive and substrate. These factors are regulated by the choice and ratio of the starting monomers. Thus, beyond the typical, modest build in adhesion observed fairly soon after bonding which results from flow or creep of the polymeric adhesive into a condition of more complete contact with the substrate surface, no effective measures have been developed to significantly increase adhesion in the bonded condition.

Copolymers derived from alkenyl azlactone and acrylic-functional carboxylic acid monomers have been prepared and disclosed in British Pat. No. 1,121,418 and U.S. Pat. No. 3,583,950. Both of these patents incorporate an alkenyl azlactone monomer in a copolymer expressly for the purpose of ultimately crosslinking the copolymer. These patents broadly teach the use of the crosslinkable, solid azlactone copolymers derived from at least three monomers in admixture with a suitable crosslinking agent (e.g., a diol or diamine) as "coating compositions". A limited expansion upon this proposed utility is found in column 5, lines 16–20, of U.S. Pat. No. 3,583,950, wherein it is stated that "the mixtures of the invention have a potlife sufficient to use them as coating or impregnating agents, as adhesives, or—optionally together with fillers—as patching materials." No mention is made of the possibility of utilizing azlactone-containing copolymers themselves as adhesives.

Normally tacky, pressure-sensitive acrylate copolymer adhesives are disclosed in U.S. Pat. No. Re. 24,906.

SUMMARY OF THE INVENTION

Briefly, the present invention provides a pressure-sensitive adhesive which, after application to a substrate, will significantly increase adhesion to the resultant bonded substrate after it is in the bonded configuration.

The present invention is based on the unexpected discovery that interpolymers of (a) certain acrylate monomers, (b) at least one acrylic-functional carboxylic acid monomer, and (c) at least one alkenyl azlactone monomer undergo a dramatic increase in adhesion (compared to the initial adhesion) in the bonded configuration. The dramatic increase in adhesion ovserved upon curing in the interpolymer of the invention is believed to be previously unknown in the art. Pressure-sensitive adhesives, and articles such as tapes, of this invention increase their level of adhesion, i.e., cure to greater than 55 percent (as measured by a peel adhesion test), preferably greater than 65 percent, and most preferably greater than 100 percent of the initially recorded value after one to three weeks in the bonded configuration, or more rapidly when the bond is subjected to elevated temperatures. In contrast, conventional pressure-sensitive adhesives and tapes exhibit only modest increases in adhesion, if any at all. In fact, it is desirable in many PSA tape uses to avoid any increase in adhesion.

Tape products of the invention thus have utility not only in applications where very high adhesion values are desired but also where the initially applied adhesive is desired to be removed for purposes of re-mounting or re-positioning. Once in place in the exact position desired, the adhesion will increase to such an extent that subsequent removal is very difficult or even impossible without damaging one or both of the substrate and backing.

The patents referenced above relating to azlactones deal exclusively with crosslinking an azlactone-containing interpolymer in the presence of a crosslinking agent to achieve the ultimately desired properties. A crosslinking agent is not added to the interpolymer in the present invention and is, in general, not desirable because the adhesion properties of the resultant pressure-sensitive adhesive and the dramatic increase in adhesion are adversely affected. Additionally, all the interpolymers of the examples in the cited patents containing an acrylic-functional carboxylic acid monomer possess calculated Tg's of room temperature (20°-25° C.) or higher. Those skilled in the art of PSA formulation know that a useful PSA possesses a Tg that is at least 40° C. lower than the contemplated use temperature. Therefore, for PSA's used at room temperature, the interpolymer Tg should be less than −15° C. for adequate tack to be present. It is clear that the patentees did not contemplate use of their disclosed polymers as PSA's.

In the present application:

"interpolymer" means the product of the simultaneous polymerization of two or more dissimilar monomers. The term "interpolymer" is used in describing the invention as opposed to "copolymer" which has been utilized in the prior art in some instances to describe the polymer resulting from the simultaneous polymerization of only two dissimilar monomers and in other instances of two or more than two dissimilar monomers;

"bonded configuration" means a pressure-sensitive adhesive in its end-use situation, i.e., when it adheres a tape backing or another solid object to a substrate; and "alkenyl azlactone" means a compound selected from the class consisting of 2-alkenyl-1,3-oxazolin-5-ones (also called 2-alkenyl-5-oxazolones in the literature), 2-alkenyl-5,6-dihydro-4H-1,3-oxazin-6-ones, and 2-alkenyl-4,5,6,7-tetrahydro-1,3-oxazepin-7-ones.

DETAILED DESCRIPTION AND SPECIFICATION OF THE INVENTION

The invention provides novel pressure-sensitive adhesives prepared by the simultaneous polymerization of minor amounts of at least one alkenyl azlactone monomer and at least one acrylic-functional carboxylic acid monomer, or precursors thereof, with a major amount of at least one acrylic monomer, the interpolymer exhibiting a glass transition temperature (Tg) of less than −15° C. The pressure-sensitive adhesives of the invention are interpolymers formed from 100 molar parts of ethylenically-unsaturated monomers which comprise (1) from about 70 to 90 molar parts of monomers consisting of
  (a) 75-100 mole percent of an acrylic acid ester of at least one non-tertiary alkyl alcohol, the molecules of said alcohol containing 1-14 carbon atoms, the average being about 5-12 carbon atoms, and
  (b) 15-0 mole percent of at least one monomer selected from the group consisting of vinyl acetate, styrene, vinyl ethers, and alkyl methacrylates, the alkyl group having 1 to 14 carbon atoms, and
  (c) 10-0 mole percent of at least one monomer selected from the group consisting of acrylamide, methacrylamide, acrylonitrile, methacrylonitrile, and N-vinyl pyrrolidone, and (2) from 25 to 5 molar parts of at least one alkenyl azlactone monomer having the formula I

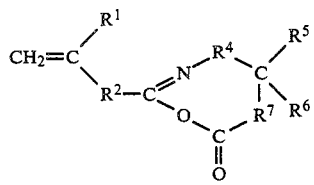

where $R^1$ is hydrogen or methyl; $R^2$ is selected from a single bond, $-R^3-$, and

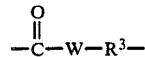

in which $R^3$ is an alkylene group having 1 to 12 carbon atoms, preferably 1 to 6 carbon atoms, and W is $-O-$, $-S-$, or $-NH-$; $R^4$ and $R^7$ are independently selected from a single bond, methylene, and substituted methylene having 1 to 12 carbon atoms; $R^5$ and $R^6$ are independently alkyl or cycloalkyl having 1 to 12 carbon atoms, aryl or aralkyl having 6 to 12 carbon atoms, or $R^5$ and $R^6$ taken together with the carbon to which they are joined form a 5- or 6-membered carbocyclic ring, or $R^5$ and $R^6$ each may be hydrogen when at least one of $R^4$ and $R^7$ is methylene; optionally, $R^3$, $R^4$, $R^5$, $R^6$ and $R^7$ can be substituted by one or more groups which are unreactive with the azlactone ring, such as alkyl having 1 to 12 carbon atoms, halo, cyano, ether, ester, keto, silyl, and sulfide, the carbon-containing substituent groups having up to 12 carbon atoms; and (3) from about 25 to 5 molar parts of at least one acrylic-functional carboxylic acid monomer, or precursors thereof. Acrylic-functional carboxylic acid monomers include acrylic acid, methacrylic acid, itaconic acid, maleic acid, and an N-acryloylamino acid. Acrylic-functional carboxylic acid monomer precursors include monomers which can be incorporated into a polymer structure and subsequently converted, for example by thermolysis, into an acrylic-functional carboxylic acid monomer unit. For example, a precursor to acrylic acid is tetrahydropyranyl acrylate whose preparation and conversion is described in Canadian Pat. No. 672,947 which is incorporated herein by reference.

As has been mentioned, the Tg of the interpolymer is critical to its utilization as a PSA, with a Tg of less than −15° C. being required for application at room temperature. Specific, useful combinations of the above monomers can be computed by application of Equation (1) [obtained from W. R. Sorenson and T. W. Campbell's text entitled "Preparative Methods of Polymer Chemistry", Interscience: New York (1968), p. 209]. Specific values for Tg's of appropriate $$\frac{1}{Tg} = \sum_{n=1}^{i} \frac{Wi}{Tgi}$$

Equation (1)

wherein
 Tg = glass transition temperature for the interpolymer
 Tgi = glass transition temperature for the homopolymer of the ith monomer
 Wi = weight fraction of the ith monomer
homopolymers were obtained, or were estimated from related polymers, from W. A. Lee and R. A. Rutherford's chapter in "Polymer Handbook", 2nd edition, edited by J. Brandrup and E. H. Immergut, Wiley: New York (1975), pp. III-139 through III-192. Specific values for alkenyl azlactone homopolymers, not included in the previous reference, were obtained from L. D. Taylor, et al., J. Polymer Sci.: Polymer Lett., 9, 187 (1971).

The acrylic monomers that comprise the major portion of the monomer charge and are commonly utilized in acrylic pressure-sensitive adhesives are described in U.S. Pat. No. Re. 24,906, which patent is incorporated herein by reference. Examples of such monomers include iso-amyl acrylate, n-hexyl acrylate, heptyl acrylate, n-octyl acrylate, iso-octyl acrylate, 2-ethylhexyl acrylate, nonyl acrylate, decyl acrylate, undecyl acrylate, dodecyl acrylate, tridecyl acrylate, and tetradecyl acrylate. A preferred embodiment of the present invention utilizes an acrylic acid ester derived from a branched eight-carbon alcohol, i.e., 2-ethylhexyl acrylate or iso-octyl acrylate, alone as the 70–90 mole percent monomer. Other unsaturated monomers defined above in (1)(b) and (1)(c) may be utilized to specifically adjust the adhesion, tack, and cohesion that make up the balance of properties of the initially applied pressure-sensitive adhesive, but they are not involved in the unusual adhesion increasing phenomenon specifically addressed in the invention.

The alkenyl azlactone monomers useful in the present invention are described in U.S. Pat. No. 4,304,705, which is incorporated herein by reference. Preferred alkenyl azlactone monomers include:
2-vinyl-4,4-dimethyl-1,3-oxazolin-5-one,
2-isopropenyl-4,4-dimethyl-1,3-oxazolin-5-one,
2-vinyl-4-ethyl-4-methyl-1,3-oxazolin-5-one,
2-vinyl-4,4-diethyl-1,3-oxazolin-5-one,
2-vinyl-4-iso-butyl-4-methyl-1,3-oxazolin-5-one,
2-vinyl-4-methyl-4-phenyl-1,3-oxazolin-5-one,
2-vinyl-4,4-diphenyl-1,3-oxazolin-5-one,
2-vinyl-4,4-pentamethylene-1,3-oxazolin-5-one,
2-vinyl-4,4-tetramethylene-1,3-oxazolin-5-one, and
2-vinyl-4,4-dimethyl-1,3-oxazin-6-one.

Preferred acrylic-functional carboxylic acids include acrylic acid, methacrylic acid, and the N-acryloylamino acids (disclosed in U.S. Pat. No. 4,157,418, which is incorporated herein by reference) such as N-acryloylglycine, N-methacryloylglycine, N-acryloylaspartic acid, and N-acryloyl-N-(2-cyanoethyl)glycine.

The interpolymers of the invention can be prepared by employing conventional solution or bulk polymerization techniques, preferably using organic solvents such as ethyl acetate, toluene, xylene, acetone, methyl ethyl ketone, acetonitrile, and tetrahydrofuran, as are described in U.S. Pat. No. 4,304,705. Alcohol solvents and chain transfer agents should be avoided since they react with the azlactone ring. A preferred method of preparing the interpolymer solutions of the invention is by photopolymerization in the absence of solvent. This method is applicable when the monomers form a solution at the polymerization temperature (typically room temperature, e.g., 20°–25° C.) and is generally described in U.S. Pat. No. 4,181,752, which method is incorporated herein by reference.

The interpolymer solutions of the invention that are prepared by conventional solution polymerization techniques are transformed into the pressure-sensitive adhesives and tapes of the invention by coating (by methods well-known in the art such as knife coating, bar coating, dip coating, roll coating, gravure coating, curtain coating, spray coating, and the like) the viscous solution containing the interpolymer onto a backing, and subsequently removing the solvent, e.g., by heating. This, of course, does not apply to interpolymers of the invention that are prepared in the absence of solvent, i.e., in bulk, utilizing the photopolymerization method, in which the monomer mixture is similarly coated onto the desired backing and polymerized in a tape configuration. The thickness of the dry coating can vary from 0.01 to 10 mm or more depending on the nature of the intended use for the adhesive.

The tape backing may be of two kinds: permanent and non-permanent. A permanent backing is one in which it is desired that the backing remain with the pressure-sensitive adhesive in the bonded configuration. Useful permanent backings are metals such as aluminum, steel including the various alloys, and copper; cloth; paper; polymeric films such as poly(ethylene terephthalate), poly(carbonates), poly(acrylates), poly(methacrylates), poly(olefin), and poly(cellulose acetate); and glass which includes glass reinforced composites. As is well known to one skilled in the art, various priming agents and surface treatments can be utilized to facilitate adhesion between the pressure-sensitive adhesive and the permanent backing. A non-permanent backing is one in which the pressure-sensitive adhesive is intended to be only temporarily bonded thereto, to facilitate transfer of the pressure-sensitive adhesive to a substrate. Once the pressure-sensitive adhesive has been adhered to the substrate, the non-permanent backing can be removed and another substrate can be bonded to the original substrate via the pressure-sensitive adhesive. Useful non-permanent backings include paper or polymeric films that have been surface-coated with various release coatings that are well known in the art such as silicone coatings disclosed in U.S. Pat. Nos. 3,061,567 and 4,216,252 that facilitate the transfer of the pressure-sensitive adhesive.

One aspect of the novelty of the present invention is that once the pressure-sensitive adhesives are in place in the bonded configuration the adhesion level between the adhesive and substrate(s) increases dramatically. This adhesion increasing phenomenon derives from the alkenyl azlactone and acrylic-functional carboxylic acid portions of the pressure-sensitive adhesives. It has been found that the increase in adhesion does not occur when one or the other of these two kinds of monomers is omitted.

In the present invention, it appears that the dramatic increase in adhesion derives from one or a combination of the following reactions:

1. Reaction of the azlactone groups on the pressure-sensitive adhesive occurs with nucleophilic groups that may be present on the substrate such as —OH, —SH, or —NHR$^8$, where R$^8$ is —H or a lower alkyl group containing 1 to 4 carbon atoms. Such a reaction is shown in Equation (2) and results in formation of a very strong covalent bond between the adhesive and the substrate, thus accounting for the increase in adhesion.

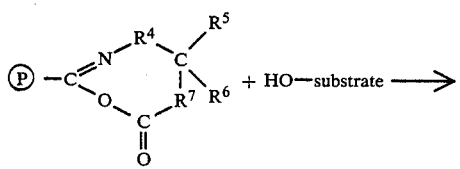

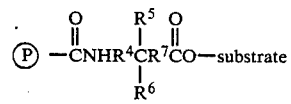

Equation (2)

wherein (P) denotes the remainder of the azlactone-containing interpolymer, and $R^4$, $R^5$, $R^6$, and $R^7$ are defined above.

2. The reaction of the azlactone groups on the pressure-sensitive adhesive with water that is adsorbed on the surface of the substrate occurs, providing an adhesive with a higher modulus and groups that can better interact with the substrate as shown in Equation (3).

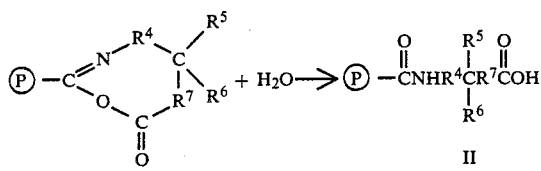

II

Equation (3)

This hydrolysis has been confirmed by infrared measurements on the films. The generation of the amidofunctional carboxylic acid (II) would result in a dramatic increase in modulus or stiffness of the adhesive because of the very much more strongly interactive nature, i.e., hydrogen bonding, of the polar amide and acid groups compared to the azlactone precursor. This kind of cohesion building effect would certainly effect the peel adhesion which is directly related to the modulus of the bonded adhesive. Furthermore, and perhaps more importantly as discussed above, adhesion is related also to interfacial attractive forces, and these would be expected to be dramatically increased upon generation of the strongly interactive acid and amide groups, especially at the adhesive-substrate interface.

3. The ring-opening hydrolysis of the azlactone ring as depicted in Equation (3) is believed to take place resulting in a net expansion in volume. According to measurements with poly(2-vinyl-4,4-dimethyl-1,3-oxazolin-5-one) and the hydrolyzed homopolymer, poly(N-acryloylmethylalanine), both polymers have approximately the same density. Thus, when mass (in the form of reacted water) is added to the system via the ring-opening hydrolysis reaction, the result is an increase in volume. The manifestation of this result from an adhesive standpoint is that an increase in adhesion will result from a mechanical locking of the adhesive to the substrate's surface, especially in those regions of the surface of the substrate that might be roughened or in any way have some irregularities, e.g., cracks, pits, and the like, present. In this manner, the adhesive increase would be very much like removing expanded, frozen water, i.e., ice, from a car windshield, which is, of course, a difficult removal problem.

The function of the acrylic-functional carboxylic acid monomer portion of the pressure-sensitive adhesive would be as a catalyst for the ring-opening reaction with a nucleophilic substrate and/or water. The catalytic function of the acid is believed to involve protonation of the ring nitrogen, as shown in Equation (4),

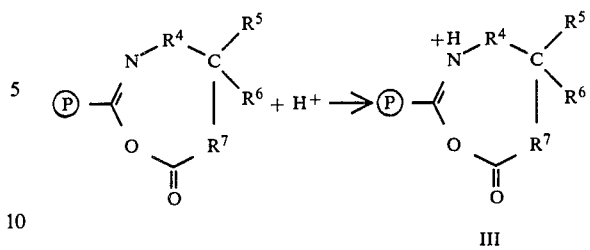

III

Equation (4)

and, in the process, producing intermediate III which would be more susceptible to nucleophilic attack than the unprotonated azlactone ring.

The PSA's of the present invention are useful in any bonding application where it may be desirable to be able to realign the joined surfaces. The rate at which the adhesion increasing event occurs, i.e., curing, is directly proportional to the temperature of the bond, and thus can be regulated at the discretion of the user. At room temperature the build may require from one to three weeks to eventually reach the maximum value. When the bond is subjected to elevated temperatures, e.g., 90°–100° C., the adhesion maximum is usually achieved in less than an hour. The temperatures and times required are somewhat variable and depend on the particular substrate and amount of moisture present.

Objects and advantages of this invention are further illustrated by the following examples, but the particular materials and amounts thereof recited in these examples, as well as other conditions and details, should not be construed to unduly limit this invention.

All of the EXAMPLES utilize the following materials and methods:

MONOMERS

Iso-octyl acrylate (hereinafter abbreviated as IOA) was prepared from iso-octyl alcohol (available from the Exxon Corporation, Chicago, IL) and acrylic acid (abbreviated as AA, available from Aldrich Chemical Company, Milwaukee, WI) by well-known esterification procedures; the water-white fraction distilling at 99°–100.5° C./11 mm was collected. In a similar fashion 2methylbutyl acrylate (MBA) was prepared from 2-methylbutanol (Union Carbide Corp., Danbury, CT) and distilled at 91° C./100 mm. 2-Ethylhexyl acrylate (EHA) (Aldrich Chemical Co., Milwaukee, WI) and lauryl methacrylate (LMA) (Aldrich Chemical Co.) were commercial samples that were passed through silica gel prior to use.

The alkenyl azlactone monomers were synthesized according to the method of L. D. Taylor, et al., *Polymer Letters*, 9, 187 (1971), which is herein incorporated by reference. The 2-vinyl-4,4-dimethyl-1,3-oxazolin-5-one monomer (hereafter abbreviated as VDM) distilled at 26°–28° C./0.6 mm, and the 2-vinyl-4,4-pentamethylene-1,3-oxazolin-5-one (designated VPM) distilled at 71°–74° C./0.3 mm. The 2-vinyl-4,4-dimethyl-1,3-oxazin-6-one (VDO) was prepared using the dicyclohexylcarbodiimide method described in U.S. Pat. No. 4,304,705. The water-white liquid distilled at 77°–78° C./6.3 mm. The identity of the compound was established by spectral and elemental analyses.

The N-acryloylaspartic acid (AAS) was prepared according to the method of S. Heilmann, et al., *J. Appl. Polymer Sci.*, 24, 1551 (1979).

All ratios are given as mole percents. Tg's were calculated according to Equation (1), and Examples of the invention exhibited values between −18° C. and −53° C.

COATABLE SYRUPS

When the photopolymerization method is utilized, it is necessary that the polymerizable monomer solution have sufficient viscosity to be suitably substantive for coating purposes. Otherwise, as is known to those skilled in the art, the monomer mixture does not coat the backing uniformly and will exhibit undesirable running and flowing after coating and before exposure to the polymerizing light. In order to obtain coatable syrups from the monomer solution, to each monomer mixture was added a photo-initiator such as Irgacure TM 651 (0.25 weight percent based on the monomer mixture; available from the Ciba-Geigy Corporation, Ardsley, NY), and the resulting solution was sparged briefly with an inert gas such as nitrogen, argon, or carbon dioxide, to remove oxygen. Then the colorless solution in a glass vessel, transparent to the actinic radiation, was exposed to the light from a bank of four fluorescent Blacklight (available from GTE Sylvania Incorporated, Danvers, MA) bulbs at a vessel-to-bulb distance of 10 cm. A preferred glass vessel was an ordinary colorless glass, laboratory jar or bottle with a screw cap. In order to achieve efficient mixing it was desirable to place the vessel on a laboratory ball mill roller under a bank of lights. Within 5–10 minutes the solution usually became noticeably thickened, and the exposure was stopped when a Brookfield viscosity (as measured with a Brookfield Viscometer, available from Brookfield Engineering Laboratories, Inc., Stoughton, MA) of 2000–3000 centipoises was achieved. This increase in viscosity was accompanied typically by a conversion of 7–10 weight percent of monomers to an interpolymer. The homogeneous coating syrups thus produced were utilized directly to prepare the interpolymers of the invention.

PHOTOPOLYMERIZATION AND TESTING CONDITIONS

The specific conditions of photopolymerization are described in U.S. Pat. No. 4,181,752 (Light Source A). All coatable syrups were knife-coated onto polyester film (15 cm wide and 0.05 mm in thickness) at a thickness of 0.05 mm. The resulting pressure-sensitive tapes were slit into 1.25 cm widths for testing. The 180° Peel Adhesion was measured according to ASTM D3330-80 (Method A for single-coated tapes). The average of three separate trials was utilized in all cases to determine the percent change in peel adhesion.

EXAMPLE 1

Pressure-sensitive tapes consisting of IOA-AA-VDM (73:13.5:13.5) (Tg = −48° C.) were prepared using the photopolymerization method described above and were applied to two stainless steel panels. The peel adhesion from one of the panels was recorded immediately, while the other panel was allowed to stand at room temperature for a period of one week. The resulting increase in peel adhesion of the tape on the panel that was allowed to stand one week relative to the sample that was measured immediately was 120 percent.

EXAMPLES 2–7

The pressure-sensitive tapes of these EXAMPLES were prepared as in EXAMPLE 1 and each was applied to two stainless steel panels as above, and one each of the panels was heated for 30 minutes at 93° C. to accelerate the increase in peel adhesion. After cooling for one hour, the adhesion values were measured and compared with the initial values. The results are given in TABLE I.

TABLE I

| Ex. No. | IOA | MBA | AA | VDM | VPM | VDO | Tg(°C.) | Percent increase in adhesion |
|---|---|---|---|---|---|---|---|---|
| 2 | 80 | — | 10 | 10 | — | — | −53 | 110 |
| 3 | 75 | — | 12.5 | 12.5 | — | — | −49 | 100 |
| 4 | 75 | — | 10 | 15 | — | — | −48.5 | 90 |
| 5 | 75 | — | 12.5 | — | 12.5 | — | −45 | 150 |
| 6 | 70 | — | 15 | — | — | 15 | −45 | 92 |
| 7 | — | 80 | 10 | 10 | — | — | −18 | 81 |

The data of TABLE I show that all interpolymers exhibited a significant build in adhesion upon being heated for 30 minutes at 93° C.

EXAMPLE 8

An EHA/LMA/AAS/VDM (55/25/5/15) interpolymer (Tg = −41° C.) was prepared by solution polymerization in dry acetone (0.4 weight fraction of monomers to solvent), using azobis(isobutyronitrile) (0.5 weight percent) as initiator, at 55° C. for 24 hours. Tapes with a dry coating thickness of 0.05 mm were prepared by coating the solution polymer onto chromated aluminum (0.05 mm) and removing the solvent at 88° C. for 10 minutes. The pressure-sensitive tapes were applied to two stainless steel panels. The peel adhesion from one of the panels was recorded immediately. The second panel was heated for 30 minutes at 93° C. After cooling for one hour, the peel adhesion value was measured and compared to the initial value, giving a percent increase in adhesion of 61 percent.

COMPARATIVE EXAMPLES 1–5

The novelty and dramatic increase in peel adhesion of present invention pressure-sensitive tapes are demonstrated by comparison to increases in peel adhesion of similarly applied and treated commercial pressure-sensitives tapes shown in TABLE II. The comparative examples of commercial pressure-sensitive tapes were applied to two panels and one panel heated as described in EXAMPLES 2–7.

TABLE II

| Comparative example number | Source of tape (3M) | Adhesive type | Percent increase in adhesion |
|---|---|---|---|
| C1 | Tape #468 | Acrylic | 53 |

TABLE II-continued

| Comparative example number | Source of tape (3M) | Adhesive type | Percent increase in adhesion |
|---|---|---|---|
| C2 | Transparent tape #810 | Acrylic | 8 |
| C3 | Filament tape #898 | Natural rubber | 0 |
| C4 | Box sealant tape #355 | Kraton ® | 3 |
| C5 | Tape #8402 | Silicone | 8 |

The data of TABLE II show that the adhesion increase was highly variable and none of the commercial tapes approached the tapes of the invention in degree of adhesion increase.

EXAMPLE 9

This example shows the effect of moisture on the adhesion increasing phenomenon. An IOA-AA-VDM (70:15:15) interpolymer (Tg= −45° C.) was prepared from carefully dried monomers (stored over 4 Å molecular sieves) by solution polymerization in dry ethyl acetate (0.4 weight fraction of monomers to solvent), using azobis(iso-butyronitrile) (available from the E. I. DuPont Co., Wilmington, DE) (0.5 weight percent) as initiator, at 55° C. for 24 hours. Tapes were prepared by coating the solution polymer onto the polyester film (at a thickness of 0.05 mm) and removing the solvent by heating at 88° C. for 10 minutes. Tapes were applied to two sets of stainless steel plates: one set which had been equilibrated for 24 hours at room temperature and 0 percent relative humidity, and a second set which had been equilibrated similarly at 90-100 percent relative humidity. The 180° peel adhesions were measured initially and after heating on the substrate at 65° C. for 3 hours. Adhesion to the "dry" (0 percent R.H.) substrate increased by only 27 percent whereas adhesion to the "wet" (90-100 pecent R.H.) substrate had increased by 106·percent.

EXAMPLE 10

This example demonstrates that the net expansion in volume that occurs when the azlactone rings hydrolyze may be important in the build in adhesion.

An IOA-AA-VDM (70:15:15) interpolymer (Tg= −45° C.) was prepared as in EXAMPLE 9. The interpolymer solution was diluted with ethyl acetate to 25 percent solids (w/w) and divided into two portions.

One portion was coated (at a thickness of 0.05 mm) onto chromated aluminum (Alodine ™ 1200, 0.05 mm thick; available from Amchem Products, Inc., Ambler, PA) with a dry coating thickness of 0.025 mm. This "unhydrolyzed" interpolymer was applied to a stainless steel plate, and the peel adhesion was recorded initially and after heating at 93° C. for 30 minutes. The resultant increase in peel adhesion relative to the unheated sample was 67 percent.

To the other portion, a stoichiometric excess of water and ethanesulfonic acid catalyst (0.05 weight percent) were added, and the mixture was heated at 55° C. for 20 hours. Infrared analysis of films of the interpolymer showed that the azlactone groups had all reacted with the water. This "hydrolyzed" interpolymer exhibited only a 12 percent increase in peel adhesion.

Various modifications and alterations of this invention will become apparent to those skilled in the art without departing from the scope and spirit of this invention, and it should be understood that this invention is not to be unduly limited to the illustrative embodiments set forth herein.

We claim:

1. A composite structure comprising:
   (a) two substrates, and
   (b) coated between said substrates a pressure-sensitive, normally-tacky, adhesive interpolymer which is the product of simultaneous polymerization of ethylenically-unsaturated monomers which comprise
   (1) from about 70 to 90 molar parts of monomers consisting of
      (a) 69–100 mole percent of an acrylic acid ester of at least one non-tertiary alkyl alcohol, the molecules of said alcohol containing 1–14 carbon atoms, the average being 5–12 carbon atoms,
      (b) 31–0 mole percent of at least one monomer selected from the group consisting of vinyl acetate, styrene, vinyl ethers, and alkyl methacrylates, the alkyl group having 1 to 14 carbon atoms, and
      (c) 10–0 mole percent of at least one monomer selected from the group consisting of acrylamide, methacrylamide, acrylonitrile, methacrylonitrile, and N-vinyl pyrrolidone, and
   (2) from 25 to 5 molar parts of at least one alkenyl azlactone monomer having the formula I

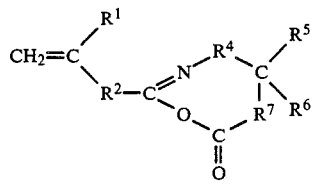

wherein $R^1$ is hydrogen or methyl; $R^2$ is selected from a single bond, $-R^3-$, or

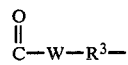

in which $R^3$ is a substituted or unsubstituted alkylene group having 1 to 12 carbon atoms, and W is $-O-$, $-S-$, or $-NH-$; $R^4$ and $R^7$ are independently selected from a single bond, methylene, or substituted methylene having 1 to 12 carbon atoms; $R^5$ and $R^6$ are independently substituted or unsubstituted alkyl or cycloalkyl having 1 to 12 carbon atoms, aryl or aralkyl having 6 to 12 carbon atoms, or $R^5$ and $R^6$ taken together with the carbon to which they are joined forming a 5- or 6-membered carbocyclic ring or $R^5$ and $R^6$ each may be hydrogen when at least one of $R^4$ and $R^7$ is methylene; and
   (3) from 25 to 5 molar parts of at least one acrylic-functional carboxylic acid monomer selected from acrylic acid, methacrylic acid, itaconic acid, maleic acid, or an N-acryloylamino acid;
   said interpolymer exhibiting a glass transition temperature (Tg) of less than −15° C., with the proviso that said substituting groups are unreactive with said azlactone ring and said monomers having been polymerized in a medium free of alcohol and other crosslinking agents capable of reacting with the azlactone ring.

2. A composite structure comprising:
   (a) two substrates, and (b) coated between said substrates a pressure-sensitive, normally-tacky, adhesive interpolymer which is the product of simultaneous polymerization of ethylenically-unsaturated monomers which comprise (1) from about 70 to 90 molar parts of monomers consisting of
 (a) 75-100 mole percent of an acrylic acid ester of at least one non-tertiary alkyl alcohol, the molecules of said alcohol containing 1-14 carbon atoms, the average being 5-12 carbon atoms,
 (b) 15-0 mole percent of at least one monomer selected from the group consisting of vinyl acetate, styrene, vinyl ethers, and alkyl methacrylate, the alkyl group having 1 to 14 carbon atoms, and
 (c) 10-0 mole percent of at least one monomer selected from the group consisting of acrylamide, methacrylamide, acrylonitrile, methacrylonitrile, and N-vinyl pyrrolidone, and (2) from 25 to 5 molar parts of least one alkenyl azlactone monomer having the formula I

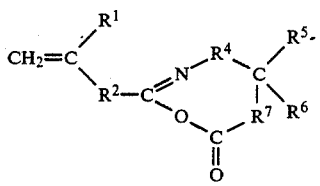

where $R^1$ is hydrogen or methyl; $R^2$ is selected from a single bond, $-R^3-$, or

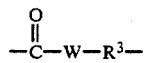

in which $R^3$ is a substituted or unsubstituted alkylene group having 1 to 12 carbon atoms, and W is $-O-$, $-S-$, or $-NH-$; $R^4$ and $R^7$ are independently selected from a single bond, methylene, or substituted methylene having 1 to 12 carbon atoms; $R^5$ and $R^6$ are independently substituted or unsubstituted alkyl or cycloalkyl having 1 to 12 carbon atoms, aryl or aralkyl having 6 to 12 carbon atoms, or $R^5$ and $R^6$ taken together with the carbon to which they are joined forming a 5- or 6-membered carbocyclic ring or $R^5$ and $R^6$ each may be hydrogen when at least one of $R^4$ and $R^7$ is methylene; and (3) from 25 to 5 molar parts of at least one acrylic-functional carboxylic acid monomer selected from acrylic acid, methacrylic acid, itaconic acid, maleic acid, or an N-acryloylamino acid;

said interpolymer exhibiting a glass transition temperature (Tg) of less than $-15°$ C., with the proviso that said substituting groups are unreactive with said azlactone ring and said monomers having been polymerized in a medium free of alcohol and other crosslinking agents capable of reacting with the azlactone ring.

3. The composite structure according to claim 1 wherein said ethylenically-unsaturated monomer of component (1)(a) of said interpolymer is an acrylic acid ester derived from an 8-carbon alcohol.

4. The composite structure according to claim 1 wherein said monomer component of said interpolymer is selected from the group consisting of (1)(a) components 2-ethylhexyl acrylate, iso-octyl acrylate, and 2-methylbutyl acrylate, and (1)(b) component lauryl methacrylate.

5. The composite structure according to claim 1 wherein said alkenyl azlactone monomer component of said interpolymer is selected from the group consisting of
2-vinyl-4,4-dimethyl-1,3-oxazolin-5-one,
2-vinyl-4,4-pentamethylene-1,3-oxazolin-5-one, and
2-vinyl-4,4-dimethyl-1,3-oxazin-6-one.

6. The composite structure according to claim 1 wherein said acrylic-functional carboxylic acid monomer component (3) of said interpolymer is selected from the group consisting of acrylic acid, methacrylic acid, and N-acryloylaspartic acid.

7. The composite structure according to claim 1 wherein said acrylic-functional carboxylic acid monomer component (3) of said interpolymer is replaced by a precursor thereof.

8. The composite structure according to claim 1 wherein component (1)(a) of said interpolymer is iso-octyl acrylate, component (2) is 2-vinyl-4,4-dimethyl-1,3-oxazolin-5-one, and component (3) is acrylic acid.

9. The composite structure according to claim 1 wherein component (1)(a) of said interpolymer is iso-octyl acrylate, component (2) is 2-vinyl-4,4-pentamethylene-1,3-oxazolin-5-one monomer, and component (3) is acrylic acid.

10. The composite structure of claim 1 wherein the interpolymer is cured.

11. The composite structure according to claim 1 wherein $R^3$, $R^4$, $R^5$, $R^6$ and $R^7$ of said alkenyl azlactone monomer are substituted by one or more groups selected from alkyl having 1 to 12 carbon atoms, halo, cyano, ether, ester, keto, silyl, and sulfide, the carbon-containing substituent groups having up to 12 carbon atoms.

12. The composite structure of claim 2 wherein the interpolymer is cured.

* * * * *